United States Patent
Liao

(10) Patent No.: US 8,875,742 B2
(45) Date of Patent: Nov. 4, 2014

(54) CLIP

(76) Inventor: Ying-Chieh Liao, Taichung (TW)

( * ) Notice: Subject to any disclaimer, the term of this patent is extended or adjusted under 35 U.S.C. 154(b) by 216 days.

(21) Appl. No.: 13/543,861

(22) Filed: Jul. 8, 2012

(65) Prior Publication Data

US 2014/0007386 A1  Jan. 9, 2014

(51) Int. Cl.
*F16B 2/10* (2006.01)
*F16L 55/11* (2006.01)

(52) U.S. Cl.
CPC .. *F16L 55/11* (2013.01); *F16B 2/10* (2013.01)
USPC ............... 138/89; 138/90; 138/91; 138/92

(58) Field of Classification Search
CPC ......... B01L 3/565; B25B 5/163; F16L 55/10;
F16L 55/105; F16L 55/1018; F16L 55/115;
F16L 55/11; F16L 55/1141
USPC ........... 24/457, 327, 334, 326, 458, 481, 455,
24/16 R, 456, 459, 489, 521, 507; 138/89,
138/90, 91
See application file for complete search history.

(56) References Cited

U.S. PATENT DOCUMENTS

| | | | | |
|---|---|---|---|---|
| 685,974 | A * | 11/1901 | Cote | 24/507 |
| 2,369,671 | A * | 2/1945 | Greenberg et al. | 118/505 |
| 2,397,438 | A * | 3/1946 | Schmid | 285/261 |
| 3,550,687 | A * | 12/1970 | Thaxton | 169/90 |
| 3,956,125 | A * | 5/1976 | Strutt et al. | 210/94 |
| 6,023,819 | A * | 2/2000 | Wong et al. | 24/510 |
| 7,188,755 | B2 * | 3/2007 | Wu | 223/91 |
| 8,522,826 | B1 * | 9/2013 | Shih | 138/89 |
| 2012/0199232 | A1 * | 8/2012 | Mitchell | 138/89 |
| 2013/0186500 | A1 * | 7/2013 | Chen | 138/89 |
| 2014/0020780 | A1 * | 1/2014 | Liao | 138/89 |

* cited by examiner

*Primary Examiner* — Robert J Sandy
*Assistant Examiner* — Michael Lee

(57) ABSTRACT

A clip includes a pair of operable jaws each of which is provided with a detachable holder. Several holders are also prepared in reserve. The holders have several kinds of shapes and sizes. Thus, by interchanging the holder with one another, the clip can fit with different kinds of tubes and multi-way valves, and with different sizes of openings or orifices. Application of the clip is expended with minimal accessories.

11 Claims, 5 Drawing Sheets

CLIP

BACKGROUND OF THE INVENTION

1. Field of the Invention

The present invention relates to a clip for sealing or clipping on an end of a tube or a multi-way valve.

2. Description of the Prior Art

Machines are designed and provided for saving labor. Such machines are always equipped with pipes, tubes, or multi-way valves. For servicing the machines, these pipes, tubes, and multi-way valves shall be temporarily sealed, or gas or liquid would spray out.

However, diameters of the pipes, the tubes, and the multi-way valves are different from one another. A considerable amount of stoppers or clips have to be prepared for fitting with the pipes. Thus, the cost for servicing is increased.

Pipe clamp is then provided for fitting with sizes of pipes. However, the clamp has to be fixed and mounted to the pipe with tools. Manipulation of the clamp is difficult and complicated.

The present invention is, therefore, arisen to obviate or at least mitigate the above mentioned disadvantages.

SUMMARY OF THE INVENTION

The main object of the present invention is to provide an operation-friendly clip which is able to seal an opening end of a tube temporarily.

To achieve the above and other objects, a clip of the present invention includes a first arm, a first holder, a second arm, an axle, and an elastic member.

The first arm comprises a first jaw and a first handle. The first handle stretches from one end of the first jaw. The first jaw is formed with a first opening. The first opening extends along a longitudinal direction of the first arm and approaches a distal end of the first jaw. The first jaw is formed with a first positioning groove which extends along an appearance of the first opening and locates at a side wall of the first opening. The first positioning groove communicates with the first opening. The first positioning groove has a top wall and a bottom wall.

The first holder is detachably and slidably disposed between the top wall and the bottom wall of the first positioning groove.

The second arm comprises a second jaw and a second handle.

The axle pierces through the first arm and the second arm, so that the first arm and the second arm are able to pivot about the axle with respect to each other, leading motion of the first jaw and the second jaw between a clutch position and a release position.

The elastic member exerts an elastic force for leading motion of the first jaw and the second jaw toward the clutch position generally.

Therefore, the clip can be utilized with a first holder which is chosen from several kinds of first holders. Interchanging of the first holder is quick and easy. Thus, the clip fits sizes and kinds of tubes, sealing the tubes easily. Machine servicing is then facilitated.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1A:
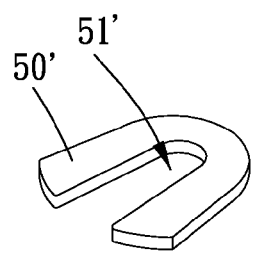
FIG. 1A is a stereogram showing a first holder which has a smaller opening.

Please refer to FIG. 1 to FIG. 4 for a first embodiment of the present invention. The clip of the present embodiment includes a first arm 10, a second arm 20, an axle 30, an elastic member, several kinds of first holders 50, 50', 50", and several kinds of second holders 60.

The first arm 10 includes a first jaw 11 and a first handle 12. The first handle 12 stretches from one end of the first jaw 11. A first connection portion 13 stretches out and is formed between the first jaw 11 and the first handle 12. The first jaw 11 is formed with a first opening 111. The first opening 111 extends along a longitudinal direction of the first arm 10 and approaches a distal end of the first jaw 11. In other words, the first opening 111 extends from the distal end of the first jaw 11 toward the first handle 12. In the present embodiment, the first opening 111 has a U-shaped appearance. The first jaw 11 is formed with a first positioning groove 112 which extends along an appearance of the first opening 111. The first positioning groove 112 communicates with the first opening 111. That is to say, the first positioning groove 112 is formed concaved from a side wall of the first opening 111. The first positioning groove 112 has a top wall and a bottom wall.

The second arm 20 includes a second jaw 21 and a second handle 22. The second handle 22 stretches from one end of the second jaw 21. A second connection portion 23 stretches out and is formed between the second jaw 21 and the second handle 22. The second jaw 21 is formed with a second opening 211. The second opening 211 extends along a longitudinal direction of the second arm 20 and approaches a distal end of the second jaw 21. In other words, the second opening 211 extends from the distal end of the second jaw 21 toward the second handle 22. In the present embodiment, the second opening 211 has a U-shaped appearance, also. The second jaw 21 is formed with a second positioning groove 212 which extends along an appearance of the second opening 211. The second positioning groove 212 communicates with the second opening 211. That is to say, the second positioning groove 212 is formed concaved from a side wall of the second opening 211. The second positioning groove 212 has a top wall and a bottom wall.

The axle 30 pierces though the first connection portion 13 and the second connection portion 23, so that the first arm 10 and the second arm 20 are able to pivot about the axle 30 with respect to each other. Thus, motion of the first jaw 11 and the second jaw 21 between a clutch position and a release position is induced. An axial direction of the axle 30 is perpendicular to extension directions of the first opening 111 and the second opening 211.

The elastic member (not shown) is disposed between the first jaw and the second jaw. The elastic member exerts an elastic force for leading motion of the first jaw and the second jaw toward the clutch position generally.

Figure 1:
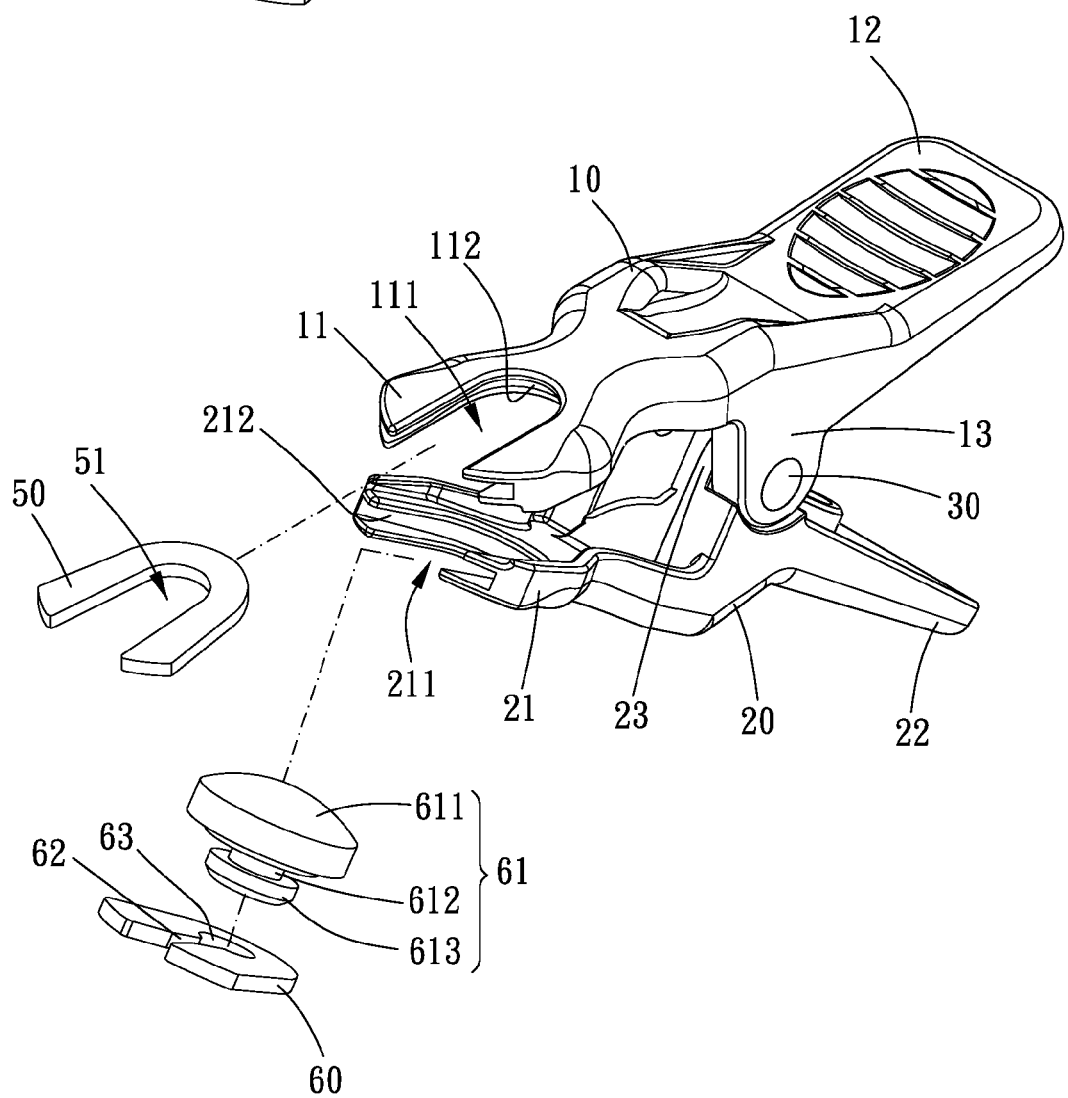
FIG. 1 is a breakdown drawing showing a first embodiment of the present invention.
Figure 2:
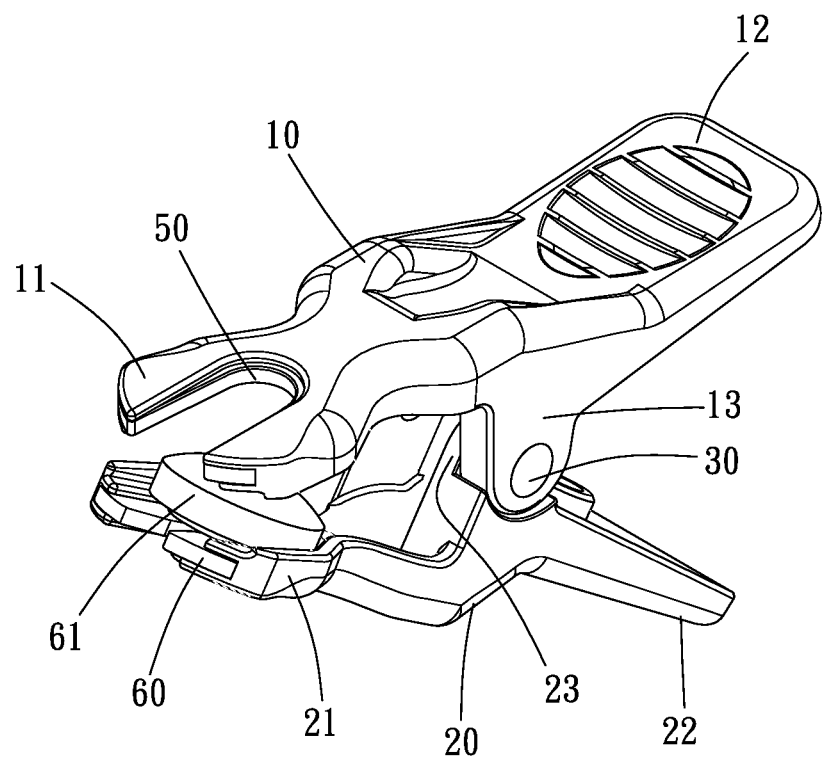
FIG. 2 is a stereogram showing a first embodiment of the present invention.
Figure 3:
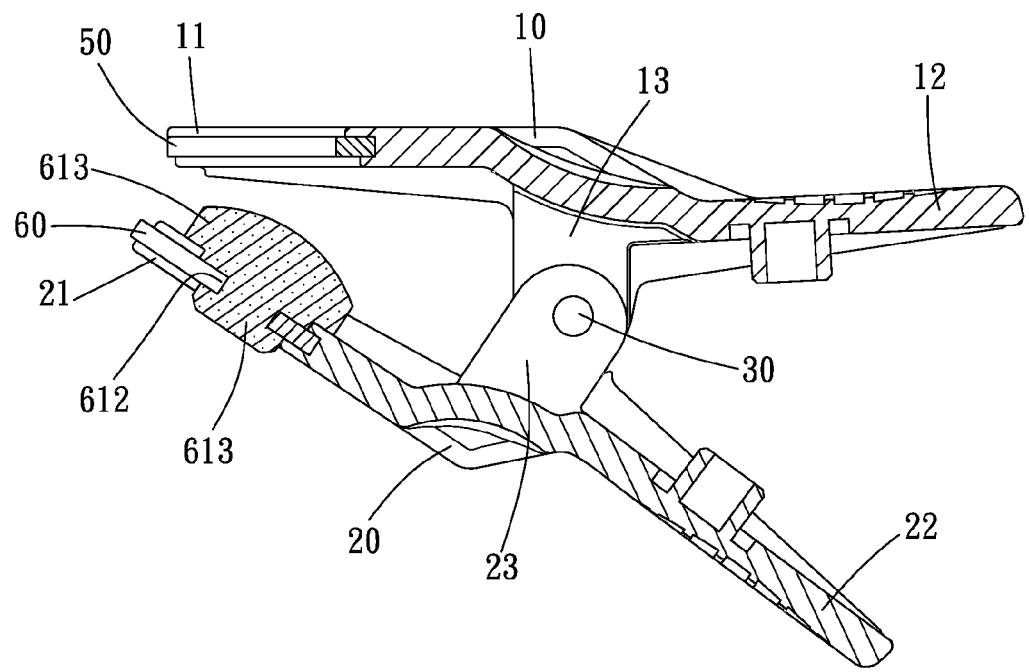
FIG. 3 is a profile showing a first embodiment of the present invention.
Figure 4:
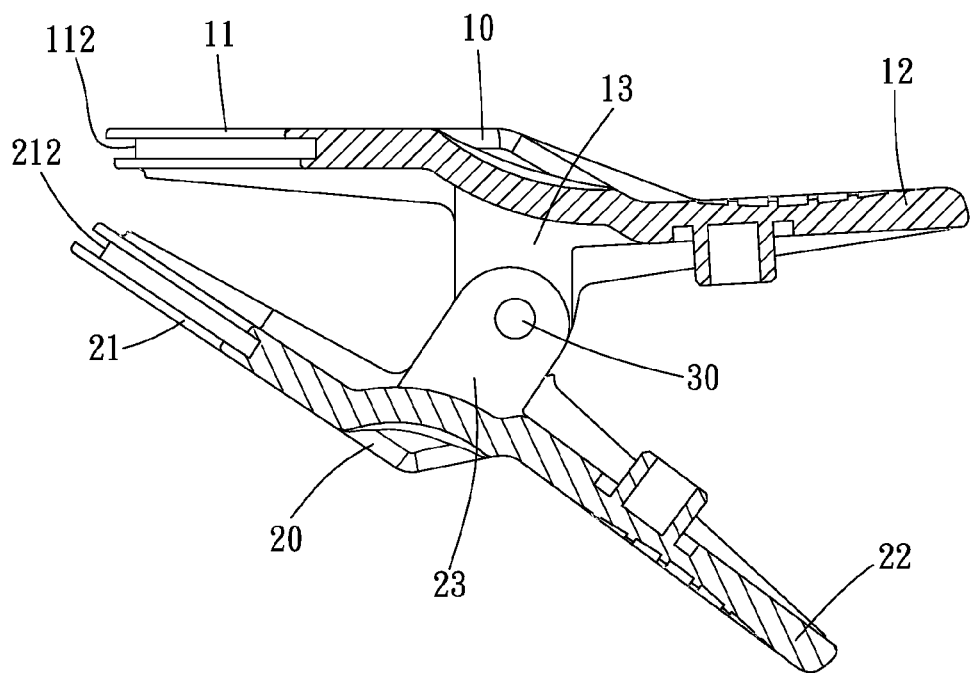
FIG. 4 is a profile showing a first embodiment of the present invention, wherein the clip is provided without holders.
Figure 6:
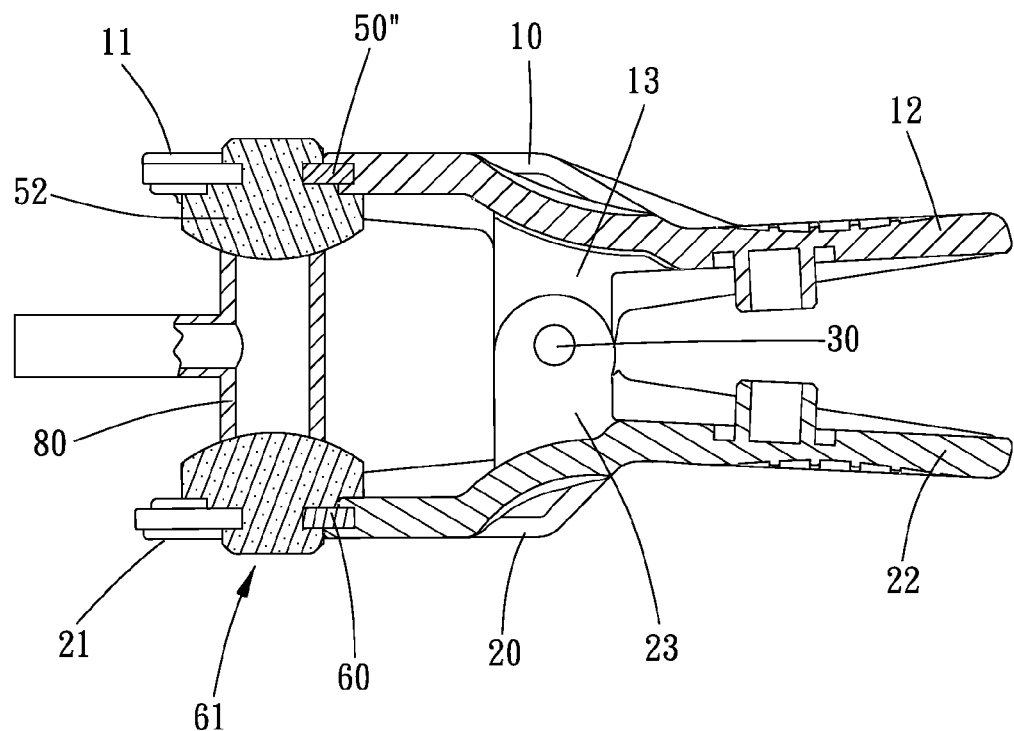
FIG. 6 is a profile showing an operation condition of a first embodiment of the present invention, wherein the clip clips on two ends of a multi-way valve.

One of the first holders 50, 50', 50" is detachably and slidably disposed between the top wall and the bottom wall of the first positioning groove 112. More specifically, the first holders 50, 50', 50" are designed with an appearance corresponding to appearance of the first positioning groove 112. In the present embodiment, the first positioning groove is U-shaped. Therefore, the first holders 50, 50', 50" are U-shaped, also. Additionally, the thickness of the first holders 50, 50', 50" is equal to the distance between the top wall and the bottom wall of the first positioning groove 112. Thus, the first holders 50, 50', 50" can be slidably received and positioned in the first positioning groove 112 via the open end of the first opening 111. Some of the first holders, 50 and 50', are respectively formed with openings 51, 51' for clipping. The openings 51, 51' have widths different from each other. For instance, as shown in FIG. 1 and FIG. 1A, width of the opening 51 of the first holder 50 is larger than width of the opening 51' of the first holder 50'. In addition, width of the first opening 11 is slightly larger than widths of the openings 51, 51'. Thus, the first holders can slightly exposed from the first positioning groove, as shown in FIG. 2. The openings of the first holders fit for sizes of tubes. The first holders and the openings of the first holders have U-shaped appearances or other suitable appearances in alternative. The first holder 50" is provided with a stopper 52, as shown in FIG. 6. The stopper 52 may be provided in several sizes chosen. Each of the first holders 50, 50', 50" is interchangeable with one another for being slidably received in the first position groove 112.

The second holder 60 is detachably and slidably disposed between the top wall and the bottom wall of the second positioning groove 212. More specifically, the second holder 60 is designed with an appearance corresponding to appearance of the second positioning groove 212. The thickness of the second holder 60 is equal to the distance between the top wall and the bottom wall of the second positioning groove 212. Thus, the second holder 60 can be slidably received and positioned in the second positioning groove 212 easily via the open end of the second opening 211. The second holder 60 is provided with a stopper 61, as shown in FIG. 1. Some second holders may be provided with opening, just as the first holder 50, for interchanging with the second holder 60. In operation condition, the first holders 50, 50', 50" may be interchanged with on another frequently. The first arm may be served with opening 51 or stopper 52. On the contrary, the second holder 60 is always provided with the stopper 61 for sealing an end of a tube. To fit with the tube, the second holder 60 may be interchanged with another second holder for choosing a stopper which has a suitable diameter. Preferably, the stopper 61 is detachably, also. Please refer to FIG. 1, the second holder 60 is formed with a tapered groove 62 and circular groove 63. The tapered groove 62 connects a distal end of the second holder 60 to the circular groove 63. The tapered groove 62 is tapered toward the circular groove 63. The stopper 61 includes a head portion 611, a neck portion 612, and a bottom portion 613. The neck portion 612 can slide along the tapered groove 62 and be temporarily positioned in the circular groove 63. Therefore, the second holder can serve sizes of tube by merely interchanging the stopper 61 with one another.

Figure 5:
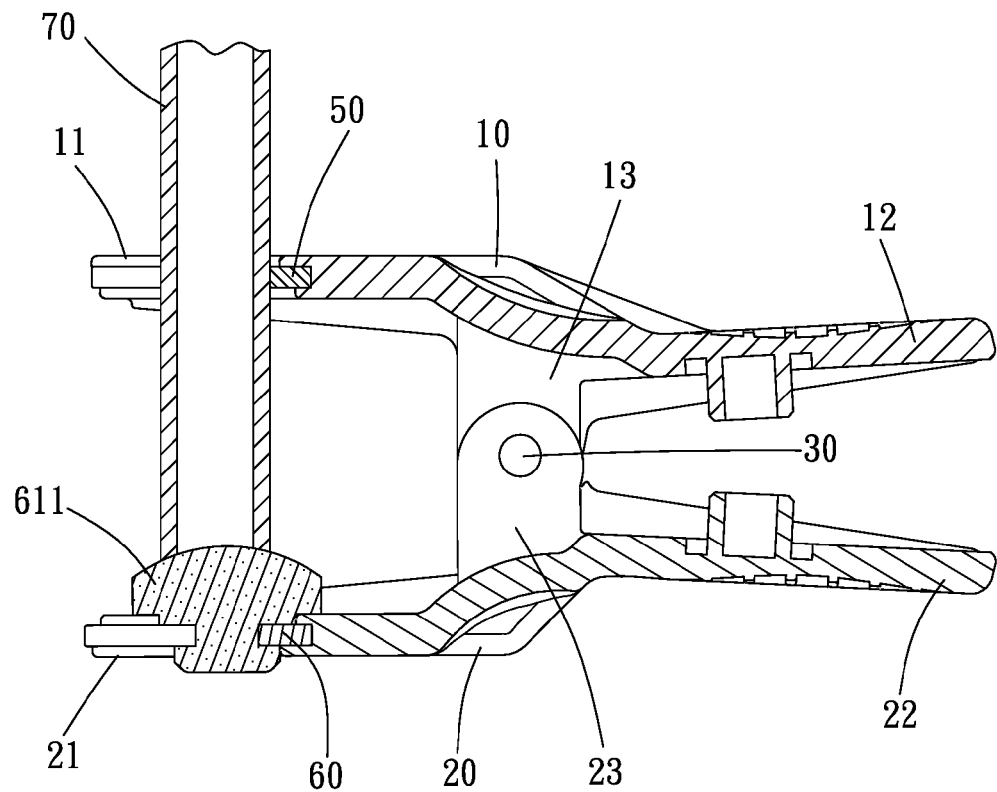
FIG. 5 is a profile showing an operation condition of a first embodiment of the present invention, wherein the clip clips on one end of a tube.

Please refer to FIG. 5. When the clip is utilized for clipping and sealing one end of a tube 70, the first holder 50 with the opening for clipping is chosen. The width of the opening of the first holder 50 fits with the diameter of the tube 70. The second holder 60 is taken with the stopper. The head portion 611 of the stopper fits with an opening at one end of the tube 70. In manipulation, the first handle 12 and the second handle 22 is held and gripped. The first jaw 11 and the second jaw 21 are then moved to the release position. The tube 70 is then clipped by the opening of the first holder 50, and the end opening of the tube 70 is covered by the head portion 611 of the stopper of the second holder 60. User releases the handles. Accompanied, the elastic force provided by the elastic member presses on the second arm, forcing the head portion 611 of the stopper of the second holder pressing on the end opening of the tube 70, sealing the tube. Gas or liquid leakage is prohibited.

Please refer to FIG. 6. When the clip is utilized for clipping and sealing two openings at two ends of a multi-way valve 80, the first holder 50" which provided with the stopper 52 is chosen. The stopper 52 of the first holder 50" and the stopper 61 of the second holder 60 fit with the openings correspondingly. With a similar manipulation as mentioned before, two openings of the multi-way valve 80 is sealed by the stoppers 52, 61. The stoppers 52, 61 press against and seal the openings of the multi-way valve with the elastic force provided by the elastic member. Gas or liquid leakage is prohibited.

Accordingly, the clip is provided with positioning grooves for detachably and slidably receiving the holders. Detachment and replacement of the holders is easily. By interchanging the holders, the clip is able to fit with tubes or multi-way valves and sizes of openings.

In addition, application of the clip is expanded. One clip can be used in several work conditions with a few kinds of holders. User may bring fewer clips for servicing.

Moreover, the clip is provided with the second holder which is formed with tapered groove and circular groove. Stopper 61 can be installed on or detached from the second holder. For fitting with sizes of openings, user may interchange the stopper 61 only, without detaching the second holder completely. Frequency of interchanging of the holders is minimized, and accessories of the clip are lessened.

What is claimed is:

1. A clip, comprising:

a first arm, comprising a first jaw and a first handle, the first handle extending from one end of the first jaw, the first jaw being formed with a first opening, the first opening extending along a longitudinal direction of the first arm and approaching a distal end of the first jaw, the first jaw being formed with a first positioning groove which extends along a side wall of the first opening, the first positioning groove communicating with the first opening;

wherein the first positioning groove has a top wall and a bottom wall;

two first holders, each being detachably and slidably disposed entirely between the top wall and the bottom wall of the first positioning groove;

a second arm, comprising a second jaw and a second handle;

an axle, piercing through the first arm and the second arm, so that the first arm and the second arm are able to pivot about the axle with respect to each other, the first jaw and the second jaw being pivotable between a clutch position and a release position;

an elastic member, exerting an elastic force for biasing the first jaw and the second jaw toward the clutch position;

wherein one of the first holders is interchangeable with the other one of the first holders and being slidably received in the first positioning groove;

wherein one of the first holders is formed with an opening;

wherein the first holder which is formed with the opening has a U-shaped appearance.

2. The clip of claim 1, wherein each of the first holders is formed with an opening, each of the openings of the first holders has a width different from a width of the other.

3. The clip of claim 2, wherein each of the first holders has a U-shaped appearance.

4. The clip of claim 3, wherein a width of the first opening is larger than those of the openings of the first holders.

5. The clip of claim 1, wherein a stopper is disposed on the other one of the first holders.

6. The clip of claim 1, wherein the first holder has an appearance corresponding to an appearance of the first positioning groove.

7. The clip of claim 1, wherein the clip further comprises a second holder, the second jaw is formed with a second opening, the second opening extends along a longitudinal direction of the second arm and approaches a distal end of the second jaw, the second jaw is formed with a second positioning groove which extends along an appearance of the second opening and locates at a side wall of the second opening, the second positioning groove communicates with the second opening, the second holder is detachably and slidably disposed in the second positioning groove.

8. The clip of claim 7, wherein a stopper is disposed on the second holder.

9. The clip of claim 8, wherein the second holder is formed with a tapered groove and a circular groove, the tapered groove connects a distal end of the second holder to the circular groove, the tapered groove is tapered toward the circular groove, the stopper comprises a head portion, a neck portion, and a bottom portion, the neck portion is able to slide along the tapered groove and be temporarily positioned in the circular groove.

10. The clip of claim 7, wherein the second holder has a shape complementary to a shape of the second positioning groove.

11. The clip of claim 7, wherein the clip comprises at least two second holders each of which is interchangeable with the other for being slidably received in the second positioning groove.

* * * * *